United States Patent
Frantz et al.

(10) Patent No.: US 11,591,987 B2
(45) Date of Patent: Feb. 28, 2023

(54) TURBOMACHINE WITH ELECTRIC MACHINE COMPRISING A ROTOR RING ATTACHED TO THE FAN

(71) Applicant: SAFRAN AIRCRAFT ENGINES, Paris (FR)

(72) Inventors: Caroline Marie Frantz, Moissy-Cramayel (FR); Gilles Alain Marie Charier, Moissy-Cramayel (FR); Loic Paul Yves Guillotel, Moissy-Cramayel (FR); Vincent Francois Georges Millier, Moissy-Cramayel (FR)

(73) Assignee: SAFRAN AIRCRAFT ENGINES, Paris (FR)

(*) Notice: Subject to any disclaimer, the term of this patent is extended or adjusted under 35 U.S.C. 154(b) by 14 days.

(21) Appl. No.: 17/287,427

(22) PCT Filed: Oct. 25, 2019

(86) PCT No.: PCT/FR2019/052554
§ 371 (c)(1),
(2) Date: Apr. 21, 2021

(87) PCT Pub. No.: WO2020/084270
PCT Pub. Date: Apr. 30, 2020

(65) Prior Publication Data
US 2021/0355893 A1   Nov. 18, 2021

(30) Foreign Application Priority Data
Oct. 26, 2018 (FR) ...................... 1859937

(51) Int. Cl.
*F02K 3/06* (2006.01)
*F01D 15/10* (2006.01)
(Continued)

(52) U.S. Cl.
CPC ................ *F02K 3/06* (2013.01); *F01D 15/10* (2013.01); *F02C 7/36* (2013.01); *H02K 7/1823* (2013.01);
(Continued)

(58) Field of Classification Search
CPC .......... F02C 7/32; F02C 7/36; F05D 2220/36; F05D 2220/76; F02K 3/06; F01D 15/10; H02K 7/1823; B60L 2200/10
See application file for complete search history.

(56) References Cited

U.S. PATENT DOCUMENTS

| 10,794,216 B2* | 10/2020 | Kupratis | F02K 3/06 |
| 2009/0039653 A1* | 2/2009 | Beutin | F02K 3/06 |
| | | | 290/52 |

(Continued)

FOREIGN PATENT DOCUMENTS

| DE | 102015214255 A1 | 2/2017 |
| EP | 2048329 A1 | 4/2009 |

(Continued)

OTHER PUBLICATIONS

International Search Report received for PCT Patent Application No. PCT/FR2019/052554, dated Feb. 26, 2020, 5 pages (2 pages of English Translation and 3 pages of Original Document).

*Primary Examiner* — Todd E Manahan
*Assistant Examiner* — David P. Olynick
(74) *Attorney, Agent, or Firm* — Womble Bond Dickinson (US) LLP (57) ABSTRACT

An aircraft turbomachine, including a fan that is able to rotate inside a casing, and an electric machine including a rotor secured to the fan and a stator secured to the casing, wherein the rotor of the electric machine includes a ring that is able to rotate inside the stator, which is linked by arms to a cone mounted upstream from the fan.

8 Claims, 5 Drawing Sheets

(51) Int. Cl.
  *F02C 7/36* (2006.01)
  *H02K 7/18* (2006.01)
  *F02C 7/32* (2006.01)

(52) U.S. Cl.
  CPC .......... *F02C 7/32* (2013.01); *F05D 2220/323* (2013.01); *F05D 2220/36* (2013.01); *F05D 2220/76* (2013.01); *F05D 2230/80* (2013.01)

(56) References Cited

U.S. PATENT DOCUMENTS

| | | |
|---|---|---|
| 2014/0246864 A1 | 9/2014 | McCormick |
| 2019/0319514 A1* | 10/2019 | Williams .............. H02K 1/2786 |
| 2021/0396147 A1* | 12/2021 | Charier .................. F02C 6/14 |

FOREIGN PATENT DOCUMENTS

| | | |
|---|---|---|
| WO | 2007/036202 A1 | 4/2007 |
| WO | 2011/109659 A1 | 9/2011 |

\* cited by examiner

TURBOMACHINE WITH ELECTRIC MACHINE COMPRISING A ROTOR RING ATTACHED TO THE FAN

The invention relates to an aircraft turbomachine comprising an electric machine.

The invention relates more particularly to an aircraft turbomachine comprising a fan, that is able to rotate inside a casing, and an electric machine comprising a rotor secured to the fan and a stator attached to said casing.

BACKGROUND

A conventional turbojet engine intended to power a commercial aircraft is generally a double-body or triple-body turbojet engine which comprises a high-pressure body comprising a high-pressure compressor and a high-pressure turbine, a low-pressure body comprising a low-pressure compressor and a low-pressure turbine and driving the fan, and possibly an intermediate-pressure body comprising an intermediate-pressure compressor and an intermediate-pressure turbine, housed in a nacelle of the turbojet engine.

The power supplied by such a turbojet engine is generally intended to ensure the propulsion of the aircraft, but also to ensure the production of electrical current intended to ensure various on-board functions of the aircraft such as, in a non-exhaustive manner, the supply of power to the flight controls, the anti-icing of the wings, the supply of power to the cabin air-conditioning system, the supply of power to the flight controls, the anti-icing of the wings, the supply of power to the cabin air-conditioning system the cabin lighting, or the supply of power to the flight deck.

Conventionally, a turbojet engine comprises a gearbox or AGB (Accessory Gear Box) which is arranged outside the turbojet engine, which is mechanically linked by a radial secondary shaft to the high-pressure body, and which comprises a generator used to transform part of the mechanical power delivered by the turbojet engine into electrical power, and a starter for starting the turbomachine.

The current trend is to increase the proportion of on-board electrical equipment, which is considered to be more flexible in terms of use in the aircraft, for example for driving compressors intended to ensure the pressurisation of the aircraft cabin. The electrical power requirements that can be supplied by the turbojet engine are therefore increasing and can no longer be provided by conventional electric generators without leading to an overall increase in the weight of the turbojet engine and a deterioration in its overall performance.

There is therefore a real interest in electric machines that can perform additional generator functions to provide additional electrical power. Reversible electric machines perform this function of generator, but also of starter, and in this respect such machines provide an obvious weight saving.

According to an embodiment known from the international application WO-2007/036202, such an electric machine, operating in a reversible manner and therefore combining the functions of generator and starter, can be arranged inside the turbojet engine itself, and more precisely in the high-pressure body.

In this document, when the turbojet engine is started, the high-pressure body is first set in rotation, using the electric generator as an electric motor. The high-pressure compressor then supplies the combustion chamber with pressurised air, allowing combustion to take place and the high-pressure stage of the turbojet engine to start. The low-pressure turbine is then rotated by the outgoing primary airflow, driving the low-pressure body and fan. The turbojet engine is then started, and power is cut to the electric starter, which stops working as a drive motor for the high-pressure compressor.

The main advantage of the arrangement of the electric generator in the high-pressure body is that on the one hand, this generator can be used as an electric motor for starting the turbojet engine, and on the other hand it can also be used as an electric generator to supply power to the rest of the aircraft.

This electric machine replaces the previously known generator and starter in the prior art, but does not provide any significant gain in electrical power.

In addition, this arrangement has the disadvantage of presenting a poor overall efficiency of the conversion of mechanical power into electrical power. Indeed, the excess fuel consumption required to supply a given electrical power is greater when the electric generator draws power from the high-pressure body than when it draws power from the low-pressure body. In addition, the arrangement of an electric generator in the high-pressure body poses numerous problems of space and accessibility. Finally, the installation of an electric generator drawing its power from the high-pressure body may pose an operability problem for the turbojet engine, as too much mechanical power draw is likely to cause the HP compressor to surge, particularly when the engine is operating at low speed.

In addition, this design does not allow for purely electrical assistance or drive of the fan by the electric machine.

In order to overcome these disadvantages, the documents EP-2.048.329 and DE-10.2015.214255-A1 propose a turbojet engine comprising a high-pressure body and a low-pressure body driving a fan arranged in a stationary casing, and an electric generator arranged in the fan and drawing power from it, the generator comprising a rotor integrated into the fan, and a stator integrated into the fan casing. In these documents, the rotor comprises permanent magnets which are integrated into the ends of the fan vanes.

This solution provides a large space for the electric machine. The fan casing, which is attached to the nacelle, is large enough to house the windings for the generation of electrical current and electrical harnesses for the delivery of this current to a pylon supporting the turbojet engine. The installation and the maintenance of the electric generator are therefore not or only slightly disturbed by space problems.

In addition, the area of the fan, the area bounded by the fan casing and the surrounding cowls of the nacelle, is a cold area, relative to the other parts of the turbomachine, with a temperature typically below 70° C. This positioning allows some cooling constraints to be avoided.

For example, the permanent magnets of the electric machine do not require additional cooling means because the temperature within the fan never reaches the Curie temperature, above which they would lose their magnetic properties.

Similarly, as the stator windings of the electric machine are placed in the same cold area of the turbojet engine, they do not require additional cooling means such as liquid cooling systems.

They can therefore have a reduced size and mass.

Furthermore, due to the large dimension of the fan, it is possible to have a relatively high-powered electric machine, capable of simultaneously supplying power to different electrical equipment on the aircraft on which the turbojet engine is mounted.

This possibility is all the more important in view of the increasing number of on-board electrical equipment on aircraft.

Such a turbomachine enables, in particular, to avoid the pumping phenomena and therefore the problems of instability and operability of the turbojet engine at low speed, by avoiding drawing excessive power from the high-pressure body.

In this design and until now, the permanent magnets have been directly integrated into the vanes or attached in the form of studs attached to the end of the vanes.

In both of these known designs, a mass is added to the end of each vane, and as a result the vanes are subjected to a greater centrifugal force than a conventional vane. This centrifugal force can lead to radial elongation of the vanes and be incompatible with the maintaining of an adequate clearance between the vanes of the fan and its casing at all speeds.

In addition, the overall increase in mass of each vane, compared to a conventional vane, implies, as has been seen, an increase in the centrifugal forces acting on the vanes, and these vanes require a larger fan centre disc to hold them in the fan.

Finally, if such a vane is lost, the kinetic energy released by this vane is greater than that released by a conventional vane in the same case. It follows that the use of such a vane requires a more massive fan casing, capable of withstanding the ejection of such a vane without the risk of being penetrated by the latter. Such a dimensional constraint largely penalises the mass of the turbomachine.

To remedy this disadvantage, it is possible to decouple the rotor of the electric machine from the fan by proposing a turbomachine using a rotor of an electric machine separate from the fan, the arms of which carry permanent magnets at their ends, as disclosed in the document US 2014/246864-A1 and, in the hydraulic or wind energy field, in the document WO 2011/109659-A1.

This design, while solving the problem of subjecting the fan blades to increased centrifugal forces, only shifts the problem because the arms of the fan rotor are also subject to centrifugal forces and these centrifugal forces can lead to radial elongation phenomena of the arms, and be incompatible with maintaining at all rotational speeds an adequate air gap between the stator and the rotor of the electric machine.

In addition, as with the previous solution, such arms, with their high mass, require the use of a large central disc to hold them in the fan.

Finally, in the event of a breakage of such an arm followed by an ejection of this arm, the kinetic energy released by this arm is very high. It follows that the use of such an arm also requires a fan casing that is more massive than a conventional casing, capable of resisting the ejection of such an arm without the risk of being traversed by the latter, which also greatly penalises the mass of the turbomachine.

SUMMARY OF THE INVENTION

The invention remedies these disadvantages by proposing a turbomachine comprising a ring-shaped electric machine attached upstream from the fan, the rotor of which is shaped like a ring.

More particularly, the invention proposes an aircraft turbomachine comprising a fan that is able to rotate inside a casing, and an electric machine comprising a rotor secured to the fan and a stator secured to said casing, characterised in that the rotor of the electric machine comprises a ring that is able to rotate inside the stator, which is linked by arms to a cone mounted upstream from the fan.

In a known way, a double flow turbomachine comprise a rotating inlet cowl at the inlet of its fan. Such a rotating inlet cowl generally consists of two parts attached to each other, the front part in the form of a cone and the rear part in the form of a shroud. In a known way, the rear end of the rear shroud is flush with the platforms of the fan vanes, being in the front aerodynamic continuity of these. The front cone has a cone-tip front end centred on the axis of rotation of the inlet cowl, also corresponding to the longitudinal axis of the fan and the turbomachine assembly.

Such a turbomachine is particularly suitable for the implementation of an architecture of the UHBR ID type (UHBR ID means Ultra High By Pass Ration, Integral Drive), which corresponds to an engine configuration with a shrouded fan with a very high bypass ratio comprising a reduction gearbox linked to the LP body, the purpose of which is to be able to independently optimise the rotational speeds of the fan and the LP turbine and which comprises one or more electric machines on the HP and LP parts of the turbomachine with powers of a few kW to several MW.

According to further characteristics of the invention:
  a hub of the rotor of the electric machine, connected to the ring, is attached between two upstream and downstream parts of the cone respectively,
  a disc of the fan comprises a tubular rim which comprises a splined bore allowing the fan disc to be coupled to a fan shaft driven by the turbomachine, said rim being provided with a first external upstream collar, and:
    the downstream part of the cone comprises a downstream end attached to the first external upstream collar of the fan disc and an upstream end provided with a second external upstream collar,
    the rotor hub of the electric machine comprises a substantially annular wall comprising a downstream end attached to the second external upstream collar, an upstream end provided with a third external upstream collar, and a tubular internal web which comprises a splined bore allowing the coupling of the rotor hub of the electric machine to the fan shaft,
    the upstream part of the cone comprises a downstream end attached to the third external upstream collar of the disc of the electric machine,
  the rotor of the electric machine comprises at least two arms linking the hub to the ring,
  the rotor of the electric machine comprises two or three arms,
  each arm is substantially straight and a vane of the fan is located substantially, according to the flow of gases through the fan, in the wake of said arm.
  each arm comprises a junction end with the hub which is tangent with said hub.

The invention also relates to an electrification kit for a conventional turbomachine of axis A comprising a fan that is able to rotate inside a casing, said fan comprising a disc driven in rotation by a fan shaft driven by a low-pressure shaft of the turbomachine and being equipped with a conventional cone attached upstream from said hub, characterized in that it comprises:
  a stator, configured to be attached upstream from said casing,
  an adaptable cone in two parts respectively upstream and downstream,
  an electric machine rotor comprising an electric machine rotor hub linked by two or three arms to a ring, and which is intended to be attached between the two upstream and downstream parts of the adaptable cone,
  said downstream part of the adaptable cone being configured to be substituted for the conventional cone, the hub of the electric machine rotor being configured to be attached to the downstream part of the adaptable cone and to the fan shaft, and the upstream part of the cone being configured to be attached to the hub of the electric machine rotor.

The elements of this kit may be used one after the other or they may be presented together in the form of an electrification module for a conventional turbomachine comprising a modular assembly of elements of the kit described above, said module comprising the rotor of the electric machine whose hub is assembled to the upstream and downstream parts of the adaptable cone and the stator, surrounding said rotor, which is flanged with respect to said rotor.

Using this module, a conventional aircraft turbomachine can be electrified according to a method of electrifying comprising:
- a first step during which a conventional turbomachine is provided,
- a second step during which the conventional cone of the turbomachine is removed,
- a third step during which the electrification module is presented in front of the fan of the turbomachine,
- a fourth step during which the stator of the electric machine is attached to the casing and the adaptable cone carrying the rotor of the electric machine is attached to the disc of the fan,
- a fifth step during which the electrification module is connected to the aircraft,
- an optional sixth step during which at least one flange connecting the stator to the rotor is removed.

DESCRIPTION OF FIGURES

The invention will be better understood and other details, characteristics and advantages of the present invention will become clearer on reading the following description made by way of non-limiting example and with reference to the attached drawings, in which.

DETAILED DESCRIPTION

In the following description, identical reference numerals designate identical parts or parts having similar functions. The designations "upstream" and "downstream" are defined in relation to a gas flow direction within a turbomachine.

Figure 1:
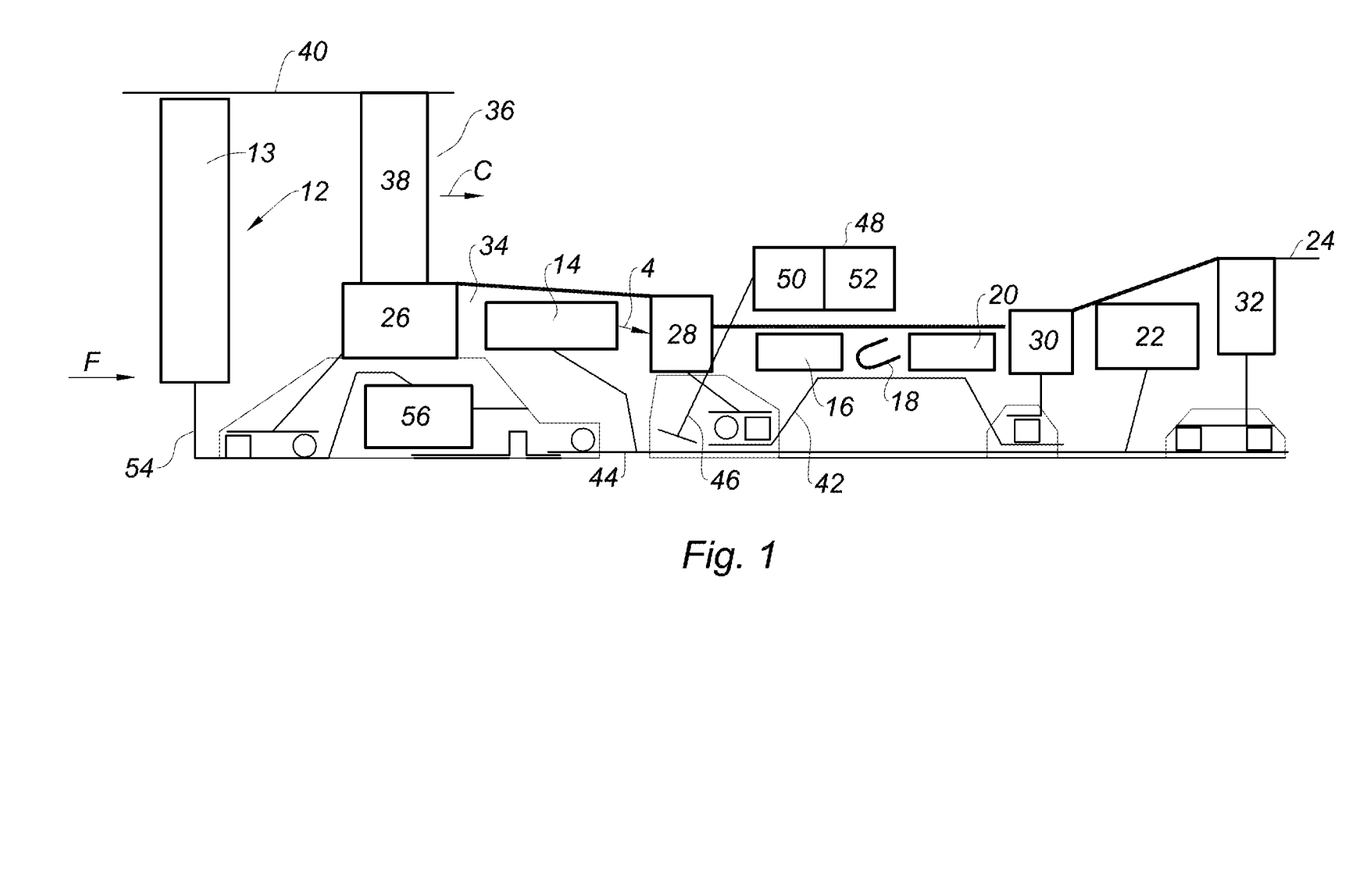
FIG. 1 is a general axial sectional view of a double flow turbojet engine of the UHBR ID type according to the prior art.

FIG. 1 shows a conventional aircraft turbomachine 10 of the UHBR ID type, which in this case is a double flow and double body turbojet engine. The overall architecture of this turbomachine 10 is a conventional double body architecture, known from many turbomachines known in the prior art. For this reason, in the remainder of this description, any reference to the general architecture of a turbomachine according to the prior art will be made by considering FIG. 1.

Essentially, the turbomachine 10 comprises, from upstream to downstream in the direction of flow of the gas flows F in the turbomachine, a fan 12, equipped with blades 13 and mounted so as to rotate in a casing 40, a low-pressure compressor 14, a high-pressure compressor 16, an annular combustion chamber 18, a high-pressure turbine 20, a low-pressure turbine 22 and an exhaust nozzle 24.

The low-pressure compressor 14, high-pressure compressor 16, annular combustion chamber 18, high-pressure turbine 20, low-pressure turbine 22 and exhaust nozzle 24 are respectively housed between upstream casing 26, inter-compressor casing 28, inter-turbine casing 30 and exhaust casing 32 of the turbomachine.

The airflow F entering the fan is divided into a hot flow HO which flows in a primary flow duct 34 through the low-pressure compressor 14, the high-pressure compressor 16, the annular combustion chamber 18, the high-pressure turbine 20, the low-pressure turbine 22 and the exhaust nozzle 24, and a cold flow C flowing around the casings 26, 28, 30, 32 in a cold flow channel 36. Outlet guide vanes or OGV 38 are placed in the cold flow channel 36 and help support the fan casing 40. The cold flow C and the hot flow H meet at the outlet of the exhaust nozzle 24.

A rotor of the high-pressure compressor 16 and a rotor of the high-pressure turbine 20 are linked by a high-pressure shaft 42 and form a high-pressure body with the latter. A rotor of the low-pressure compressor 14 and a rotor of the low-pressure turbine 22 are linked by a low-pressure shaft 44 and together form a low-pressure body.

The high-pressure shaft 42 drives via a radial shaft 46 a gearbox 48 which here contains an independent starter 50 and an independent generator 52. According to some other architectures known to the prior art, the starter 50 and the generator 52 can be replaced by an electric machine (not shown) alternately forming a starter and a generator.

In the upstream part of the turbomachine 10, the fan 12 is linked to a fan shaft 54 which, in the example shown, is rotatably connected to the LP shaft 44 via a gearbox 56, for example a planetary or epicyclic gearbox 56, which has been shown here schematically, one member of which is connected to the fan shaft 54, one member of which is connected to the low-pressure shaft 44 and one member of which is connected to the upstream casing 26.

For example, a planetary gear is connected to the shaft 44 of the low-pressure body, a planet carrier is connected to the shaft 54, and a ring gear is connected to the casing 26.

The fan 12 can thus, when it is very large, be driven at a lower speed than the LP shaft 44, in order to better match it aerodynamically.

In this design, however, the production of electrical energy is only generated by the generator 52. As long as the electrical power requirements are limited, this design is suitable. However, the electrical power that can be effectively drawn by the generator 52 is limited and is not suitable for the increasing electrical power requirements of modern aircraft as the production of more electrical power would necessarily result in additional mechanical power being drawn by the generator 52 from the high-pressure HP shaft 42, leading to a degradation in the performance of the HP compressor by risking surge phenomena.

In addition, in this configuration, the starter 48 only allows the turbomachine to be started, but is not able to transmit any driving power to the shaft 54 of the fan 12, since it is not connected to the LP shaft 44.

In order to benefit from greater electrical power, one solution is to provide a turbomachine 10 comprising an electric machine connected to the fan 12. This electric machine is reversible and operates as a generator as well as a motor. As a generator, it is therefore capable of supplying an electrical power, independently or in addition to the generator 52.

Furthermore, as a motor, such an electric machine is also capable of performing propulsive functions and can supply additional driving power to the fan.

Such electric machines have so far been proposed in two designs.

In the first design, it has been proposed to integrate the rotor of the electric machine directly into the fan. In this case, the permanent magnets have always been either directly integrated into the vanes 13 or attached in the form of sectorial stubs which are attached to the end of the vanes 13.

In both cases, a mass is added to the end of each vane 13, and as a result the adapted vanes 13 are subjected to a greater centrifugal force than the conventional vanes. This centrifugal force can lead to radial elongation of the vanes 13 and be incompatible with maintaining adequate functional clearance between the vanes 13 of the fan 12 and its casing 40 at all rotational speeds.

In addition, a high mass vane 13 requires the use of a large central disc for its support.

Finally, if such a vane 13 is lost, the kinetic energy released by this vane 13 is greater than that released by a conventional vane in the same case. It follows that the use of such a vane 13 requires a more massive fan casing 40, capable of withstanding the ejection of such a vane 13 without the risk of being penetrated by it. Such a dimensional constraint largely penalises the mass of the turbomachine 10.

In another design, it has been proposed to attach the rotor of the electric machine to the fan 12. Such a rotor comprises free arms arranged in the extension of the vanes 13, upstream or downstream of them, the ends of which carry permanent magnets. In this case, as before, a mass is added at the end of each arm of the rotor of the electric machine, and as a result these arms are subject to a centrifugal force which can lead to phenomena of radial elongation of the arms and be incompatible with maintaining an adequate air gap between the rotor of the electric machine and its stator at all rotation speeds.

This design therefore has substantially the same disadvantages as the previous design, which now apply to these free arms.

The invention remedies this disadvantage by providing a new design for an electric machine rotor attached to the fan 12.

The turbomachine according to the invention comprises, like the turbomachine of the prior art, a planetary or epicyclic gearbox, the members of which are connected to a casing of the turbomachine, to a shaft of the low-pressure body, and to a drive shaft of the disc of the fan.

Figure 2:
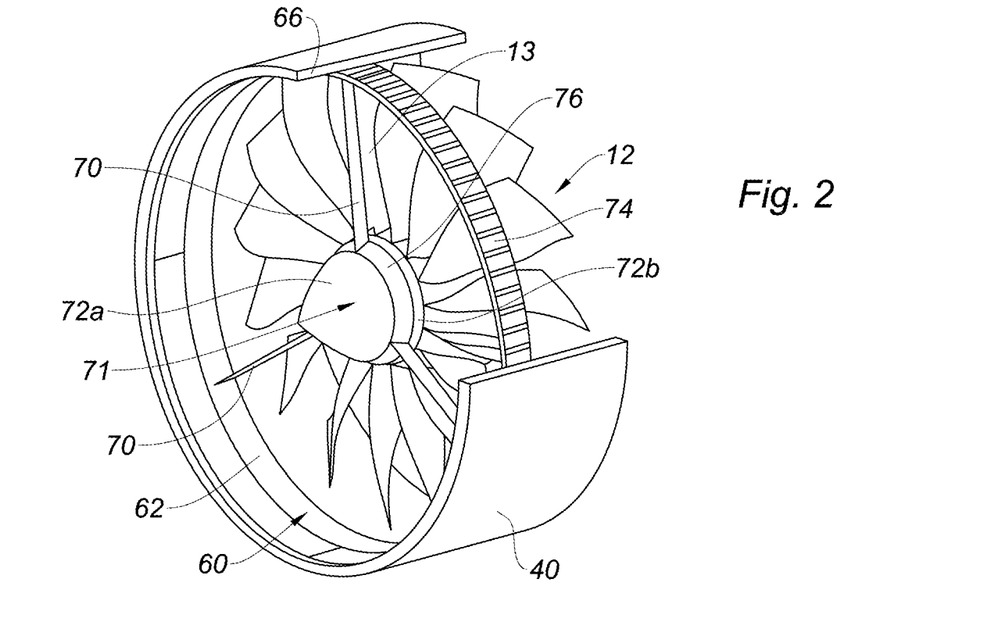
FIG. 2 is a perspective view of an electric machine, according to the invention, attached to a fan.

In accordance with the invention, as illustrated in FIG. 2, a rotor 60 of the electric machine comprises a ring 62 that is able to rotate within a stator 66, which is linked by arms 70 to a cone 71 mounted upstream from the fan 12.

In the design as shown in the figures, the ring 62 carries permanent magnets 74. It will be understood that this configuration is not limiting the invention, and that the ring 62 could for example comprise windings, the permanent magnets then being carried by the stator 66.

In any event, this solution enables to dissociate the aerodynamic function of the vanes 13 of the fan 12 from that of the torque transmission function of the electric machine, which is performed by the arms 70 upstream from the vanes 13 of the fan.

As the arms 70 are advantageously held circumferentially by the mobile ring 62, the forces resulting from the centrifugal forces exerted on the arms 70 are compression forces which are able to be taken up in part by the ring, which enables to reduce the forces exerted on the arms 70.

This allows for aerodynamically optimised vanes 13 and the optimised arms 70 for the transmission of the torque of the electric machine. The vanes 13 can therefore remain conventional vanes that can be removed under the wings of the aircraft without removing the turbomachine 10, which is a significant advantage for airlines.

The electric machine is also located outside the turbomachine 10, which facilitates its cooling and access for maintenance.

Figure 4:
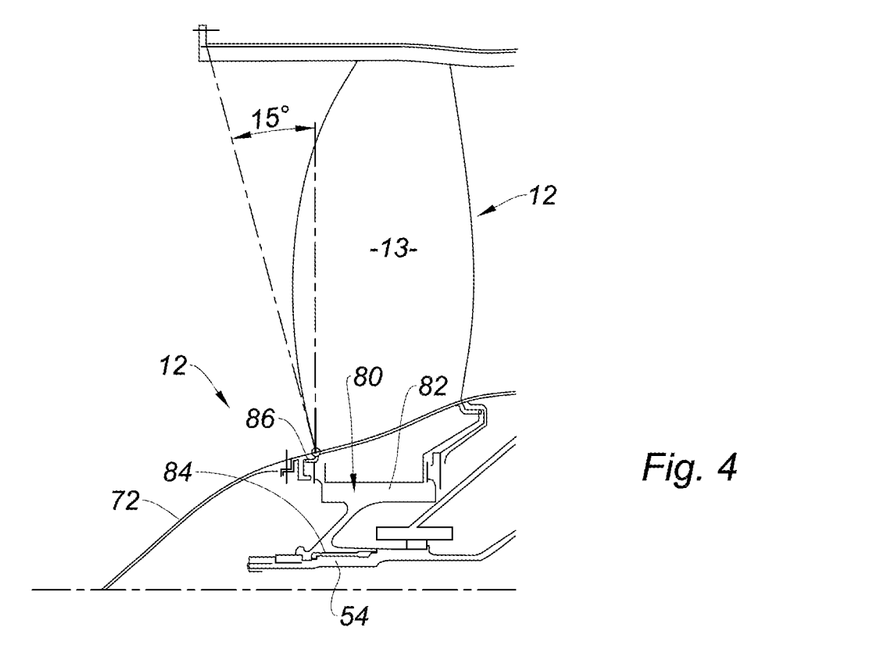
FIGS. 4 to 6 are cross-sectional views of an upstream end of a turbomachine during the steps of an electrifying method according to the invention.
Figure 6:
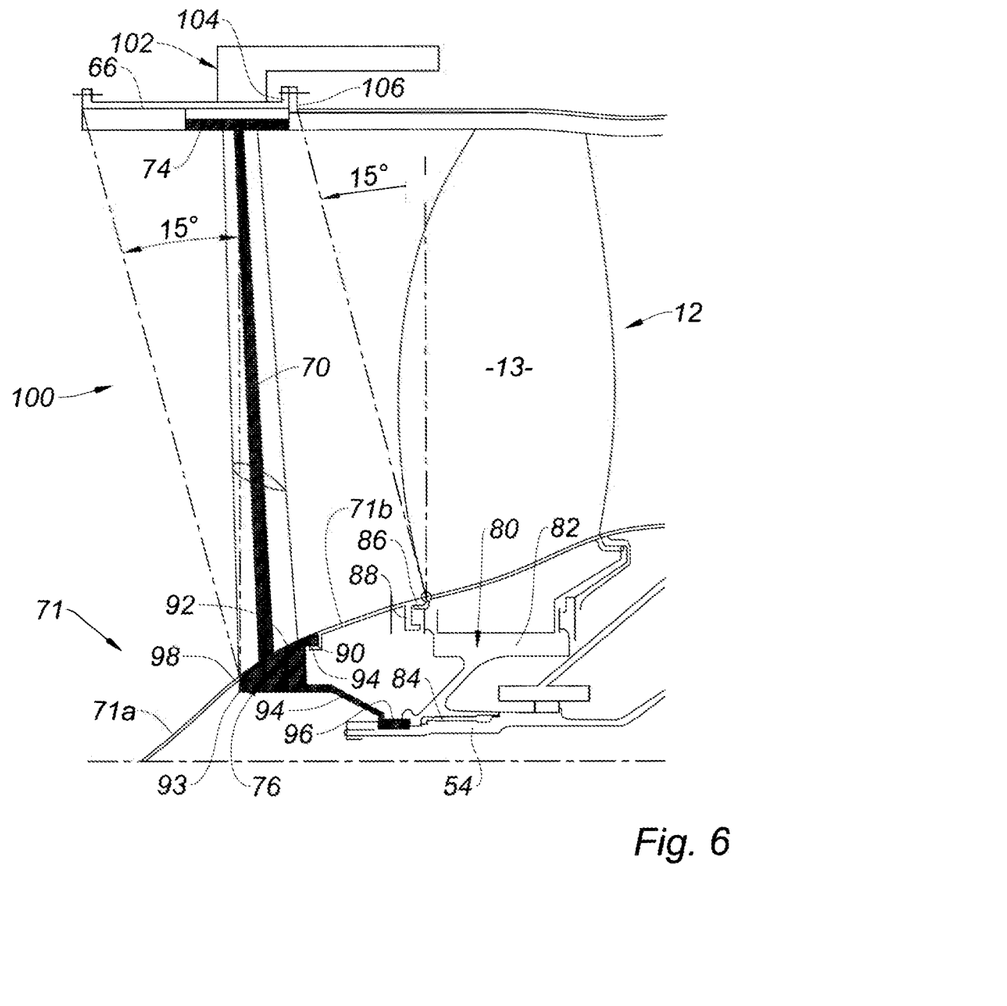

To ensure the connection of the mobile ring 62 to the cone 71, as illustrated in FIGS. 2 and 6, a hub 76 of the rotor of the electric machine, connected to the ring 62, is attached between two upstream and downstream parts respectively 72a, 72b of the cone 71 which is an adaptable cone replacing a conventional cone 72 as shown in FIG. 4.

Figure 5:
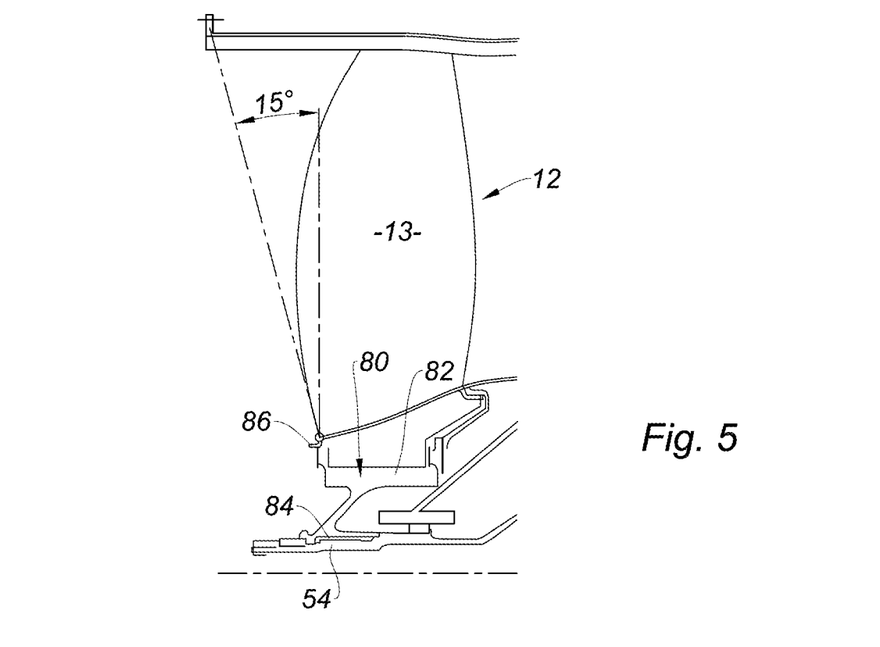

More particularly, in order to secure the rotor 60 to the fan 12, as illustrated in FIGS. 4 to 6, advantage is taken of the presence of a disc 80 of the fan 12 provided with a tubular rim 82 which comprises a splined bore 84 allowing the disc 80 to be coupled to the fan shaft 54. This shaft 54 is, as noted, driven by the LP shaft 44 via a gearbox.

As illustrated in FIG. 4, in the case of a conventional turbomachine, at the front of this tubular rim 82 is conventionally arranged a rotating inlet cowl 69 consisting of two parts attached to each other, namely the cone 82, and a first external upstream collar 86 of the rim 82 to which this cone 72 is directly attached. The cone 72 comprises a free end 83 in the form of a tip centred on the axis A of rotation of the inlet cowl 69, which corresponds with the axis of the fan, and a junction end 85 with the collar 86 which is substantially flush with the platforms 15 of the vanes 13, so as to be placed in the aerodynamic continuity of the latter.

Advantageously, the invention enables to electrify a conventional turbomachine by substituting an adaptable cone 71 shown in FIG. 6 for the original cone 72 of the turbomachine shown in FIG. 4. This cone 71 is made in two parts, upstream 71a and downstream 71b, and is intended to receive the rotor 60 of the electric machine. It is attached in place of the cone.

To this end, as illustrated in FIG. 6, a downstream part 71b of the adaptable cone 71 comprises a downstream end 88 which is attached to the first external upstream collar 86 of the disc 80 and an upstream end provided with a second external upstream collar 90. To this second external upstream collar 90 is attached the hub 76 of the rotor 60 of the electric machine, which is linked by the arms 70 to the ring 62.

The hub 76 comprises a substantially annular wall 92 comprising a downstream end 94 attached to the second external upstream collar 90 of the downstream part 71b of the adaptable cone. The hub 76 comprises an upstream end provided with a third external upstream collar 93 which cooperates with the upstream part 71a of the adaptable cone 71.

The hub 76 of the rotor 60 of the electric machine also comprises a tubular internal web 94 which comprises a splined bore 96 allowing the coupling of the rotor hub of the electric machine to the fan shaft 54. It is therefore through this web 94 that the torque of the electric machine travels.

The upstream part 71a of the adaptable cone 71 comprises a downstream end 98 which, as we have seen, is attached to the third external upstream collar 92 of the rotor hub 76 of the electric machine.

To ensure that the ring 62 is held in place with respect to the hub 76, the rotor 60 of the electric machine comprises at least two arms 70 linking the hub 76 to the ring 62.

In order to limit disturbances to the flow F entering the fan, it is desirable that the number of these arms be as small as possible. For this reason, the rotor 60 of the electric machine preferably comprises no more than three arms 70. Thus, the rotor of the electric machine comprises only two or three arms 70.

Similar to a conventional fan, the fan 12 maintains an even distribution of its vanes 13. To reduce the aerodynamic disturbance created by the arms 70, the arms 70 are arranged so that one vane 13 is located substantially, according to the gas flow through the fan 12, in the wake of each arm 70. For the same purpose, each arm 70 is substantially straight. The airflow F is therefore disturbed to a minimum.

Figure 3:
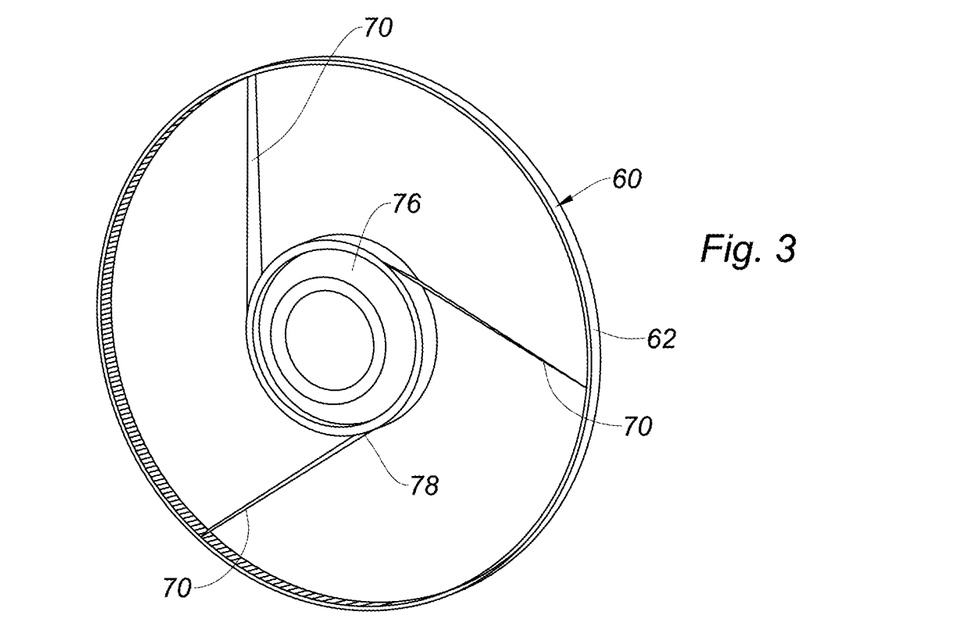
FIG. 3 is a perspective view of a ring of a rotor of the electric machine according to the invention.

The arms 70 may be purely radial, as illustrated in FIG. 2. Alternatively, the arms may be tangential to the hub. To this end, as illustrated in FIG. 3, each arm 70 comprises a junction end 78 with the hub 76 which is tangent to the hub 76.

The stator 66 of the electric machine comprises a harness 102 of electrical auxiliaries which is linked directly to a pylon (not shown) of the aircraft.

These various elements enable to propose an electrification kit 100 for a conventional turbomachine as described above, in order to ensure its electrification without replacing it.

As illustrated in FIG. 6, such a kit 100 thus comprises an adaptable cone 71 made in two parts respectively upstream and downstream 71a, 71b, and a rotor 60 of an electric machine comprising an electric machine rotor hub 76 linked by two or three arms 70 to a ring 62 comprising or carrying permanent magnets 74, which is intended to be attached between the two upstream and downstream parts 71a, 71b of the adaptable cone 71.

In this kit, the downstream part 71b of the adaptable cone 70 is configured, in particular by its dimensions and fixing points, to be substituted for the conventional cone 72, and the hub 76 of the electric machine rotor 60 is in turn configured to be attached to the downstream part 71b of the adaptable cone 71 and to the fan shaft 54. The upstream part 71a of the cone 71 is configured to be attached to the hub 76 of the electric machine rotor 60.

The kit 100 also comprises a stator 66 which is configured to be attached upstream from the fan casing 40. Where it comprises windings as is the case here, the stator 66 comprises a harness 102 of electrical auxiliaries which can be linked directly to a pylon (not shown) of the aircraft without modifying the existing turbomachine 10. In particular, the stator 66 may comprise a downstream annular face 104 which may be directly attached to an upstream face 106 of the fan casing 40.

The components of this kit may be fitted to the turbomachine 10 one after the other. However, preferably, they will be in the form of an electrification module of a conventional turbomachine, pre-assembled and capable of being transported as such to a production site. This module comprises the rotor 60 of the electric machine, the hub 76 of which is pre-assembled with the upstream and downstream parts 71a, 71b of the adaptable cone 71, and the stator 66 surrounding the rotor 60. Advantageously, the rotor 60 is removably flanged with respect to the stator 66 and it is only once assembled to the turbomachine 10 that these removable flanges are removed.

Figure 7:
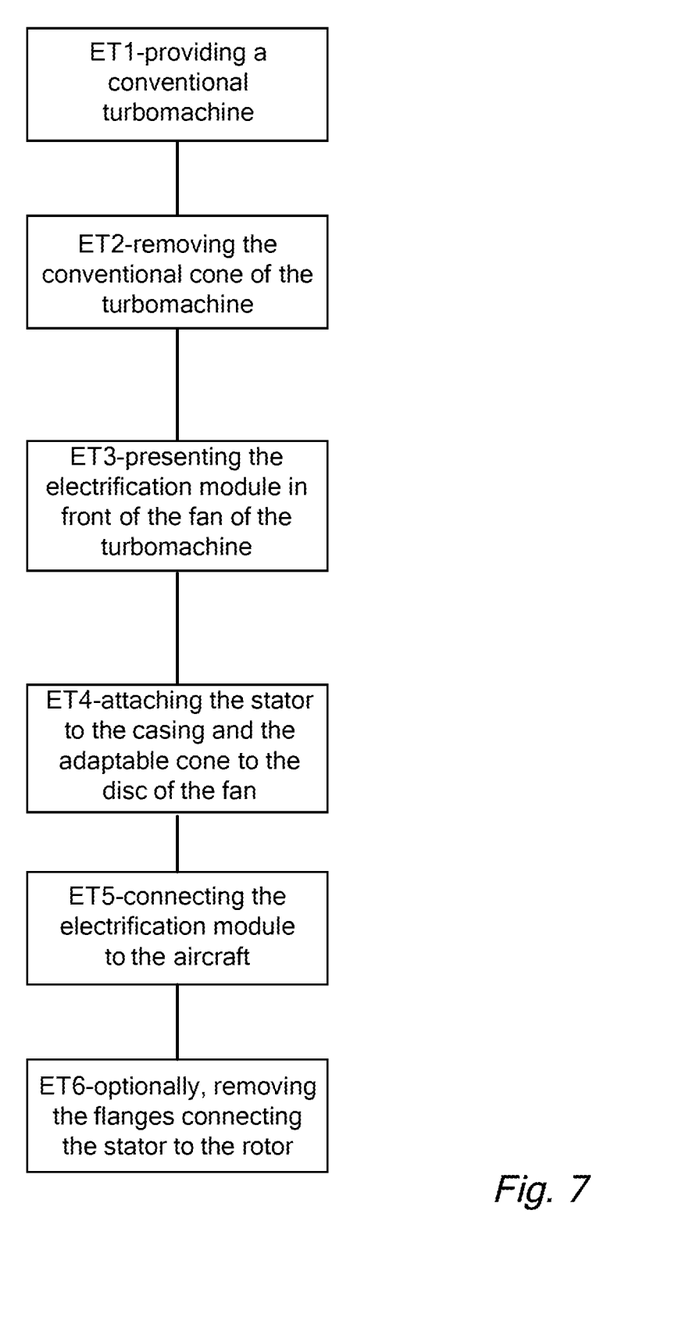
FIG. 7 is a block diagram illustrating the steps of a method of electrifying of a turbomachine according to the invention.

It is therefore possible to ensure the electrification a conventional aircraft turbomachine 10 using an electrification module of the type described above according to a method whose steps have been shown in FIG. 7.

In a first step ET1, also shown in FIG. 4, a conventional turbomachine 10 is provided.

Then, in a second step ET2, which was also shown in FIG. 6, the conventional cone 72 of the turbomachine 10 is removed.

Then, in a third step ET3, the electrification module comprising all the pre-assembled elements of the kit 100 is presented in front of the fan 12 of the turbomachine 10.

Then, during a fourth step ET4, the stator 66 of the electric machine is attached to the casing 40 and the adaptable cone 71, 71a, 71b, carrying the rotor 60 of the electric machine, is attached to the disc 80 of the fan 12.

Then, in a fifth step ET5, the electrification module is connected to the aircraft. In this case, the harness 102 of electrical auxiliaries is connected to the aircraft. The result is the assembly shown in FIG. 6.

Optionally, in a sixth step ET6, the flanges connecting the stator 66 to the rotor 60 are removed.

The invention thus enables to ensure the electrification a conventional turbomachine 10 very simply.

This electrification is all the more advantageous in that the electric machine can therefore be an option that the airline in charge of the aircraft chooses whether or not to install on the turbomachine 10. It is possible in this respect to envisage a whole range of electric machine powers according to the needs of the airline. In the event of irreversible damage to the turbomachine, the electric machine can also be reused and reassembled on a turbomachine of the same type. Conversely, in the event of irreversible damage to the electric machine, it can be dismantled and a new identical electric machine can be fitted to the turbomachine.

The invention claimed is:

1. An aircraft turbomachine comprising
   a casing;
   a fan that is able to rotate inside the casing,
   a cone mounted upstream of the fan and
   an electric machine comprising:
      a rotor, comprising a ring, secured to the cone,
      a stator secured to said casing,
      arms that link the ring to the cone,
      wherein the ring and stator are positioned upstream of the fan and wherein the ring rotates inside the stator to generate electricity.

2. The turbomachine according to claim 1, wherein a hub of the rotor of the electric machine, connected to the ring, is attached between an upstream part and a downstream part of the cone respectively.

3. The turbomachine according to claim 2, wherein a disc of the fan comprises a rim which comprises a splined bore allowing the fan disc to be coupled to a fan shaft driven by the turbomachine, said rim being provided with a first external upstream collar, and in that:
   the downstream part of the cone comprises a downstream end attached to the first external upstream collar of the fan disc and an upstream end provided with a second external upstream collar,
   the hub of the rotor of the electric machine comprises a substantially annular wall comprising a downstream end attached to the second external upstream collar, an upstream end provided with a third external upstream collar, and a tubular internal web which comprises a splined bore allowing the coupling of the rotor hub of the electric machine to the fan shaft, the upstream part of the cone comprises a downstream end attached to the third external upstream collar of the rotor hub of the electric machine.

4. The turbomachine according to claim 2, wherein the rotor of the electric machine comprises at least two arms linking the hub to the ring.

5. The turbomachine according to claim 4, wherein the rotor of the electric machine comprises two or three arms.

6. The turbomachine according to claim 4, wherein each arm is substantially straight and a vane of the fan is located substantially, according to the flow of gases through the fan, in a wake of said arm.

7. The turbomachine according to claim 6, wherein each arm comprises a junction end with the hub which is tangent with said hub.

8. A method of electrifying a conventional aircraft turbomachine using an electrification module comprising:

a first step during which a conventional turbomachine is provided, said conventional turbomachine comprising, a casing, a fan that is able to rotate inside the casing and a conventional cone mounted upstream of the fan, a second step during which the conventional cone of the conventional turbomachine is removed, a third step during which the electrification module is presented in front of the fan of the conventional turbomachine, said electrification module comprising a stator and a rotor of an electric machine and an adaptable cone wherein the rotor includes a ring configured to rotate inside the stator to generate electricity, said ring linked to the adaptable cone by arms;

a fourth step during which the stator of the electric machine is attached to the casing upstream of the fan and the adaptable cone carrying the rotor of the electric machine is attached to the disc of the fan such that the ring of the rotor of the electric machine is positioned adjacent to and radially inward of the stator, and a fifth step of electrically connecting the electrification module to the aircraft.

* * * * *